United States Patent
Joffe

(10) Patent No.: US 6,625,122 B1
(45) Date of Patent: Sep. 23, 2003

(54) SELECTION OF DATA FOR NETWORK TRANSMISSION

(75) Inventor: Alexander Joffe, Palo Alto, CA (US)

(73) Assignee: Applied Micro Circuits Corporation, San Diego, CA (US)

(*) Notice: Subject to any disclaimer, the term of this patent is extended or adjusted under 35 U.S.C. 154(b) by 0 days.

(21) Appl. No.: 09/449,146

(22) Filed: Nov. 24, 1999

(51) Int. Cl.[7] ............................................... H04L 12/26
(52) U.S. Cl. ..................................... 370/230; 370/395.4
(58) Field of Search ................................. 370/229, 230, 370/230.1, 235, 395.1, 395.4, 395.41, 395.42, 395.43, 412, 413, 414, 415, 416, 417, 418, 428, 429

(56) References Cited

U.S. PATENT DOCUMENTS

| | | | |
|---|---|---|---|
| 5,231,633 A | 7/1993 | Hluchyj et al. | 370/94.1 |
| 5,533,009 A | 7/1996 | Chen | 370/17 |
| 5,535,201 A | 7/1996 | Zheng | |
| 5,633,859 A | 5/1997 | Jain et al. | 370/234 |
| 5,771,234 A | 6/1998 | Wu et al. | 370/396 |
| 5,793,747 A * | 8/1998 | Kline | 370/230 |
| 5,982,771 A * | 11/1999 | Caldara et al. | 370/389 |
| 6,359,861 B1 * | 3/2002 | Sui et al. | 370/230 |
| 6,408,005 B1 * | 6/2002 | Fan et al. | 370/412 |
| 6,438,134 B1 * | 8/2002 | Chow et al. | 370/230 |

FOREIGN PATENT DOCUMENTS

| | | |
|---|---|---|
| EP | 0 710 046 A2 | 5/1996 |
| EP | 0 874 531 A2 | 10/1998 |
| EP | 0 874 532 A2 | 10/1998 |

OTHER PUBLICATIONS

MMC Networks, Inc., *AF5500 Chip Set User Guide*, Jul. 1998, pp. 8–1 through 8–40.

* cited by examiner

Primary Examiner—Kwang Bin Yao
(74) Attorney, Agent, or Firm—Michael Shenker; MacPherson Kwok Chen & Heid LLP

(57) ABSTRACT

Data flows are queued in an active queue (160.0) waiting for transmission. In each time slot, one data flow can be dequeued from the head of the active queue, and a data unit can be transmitted on the data flow. Then the data flow is placed in a queue "i" which is one of the queues 1, 2, ... N. Data flows are transferred from queue "i" to the active queue once in every $2^i$ time slots. When a data flow is dequeued from the active queue and transferred to queue i, the queue number "i" is determined as $i=\log \Delta$, rounded to an integer, where $\Delta$ is the number of time slots in which one data unit must be transmitted from the data flow in order to meet a data flow bandwidth parameter. If the data flow has waited for "d" time slots in the active queue before being dequeued, then $i=\log (\Delta-d)$, rounded to an integer.

20 Claims, 13 Drawing Sheets

FIG. 4A

CURRENT_TIME = 1 (00_001'B) — 210

ACTIVE
0: B
1: B
2: C A
3:
Q_Id:

HISTORY: B

FIG. 4

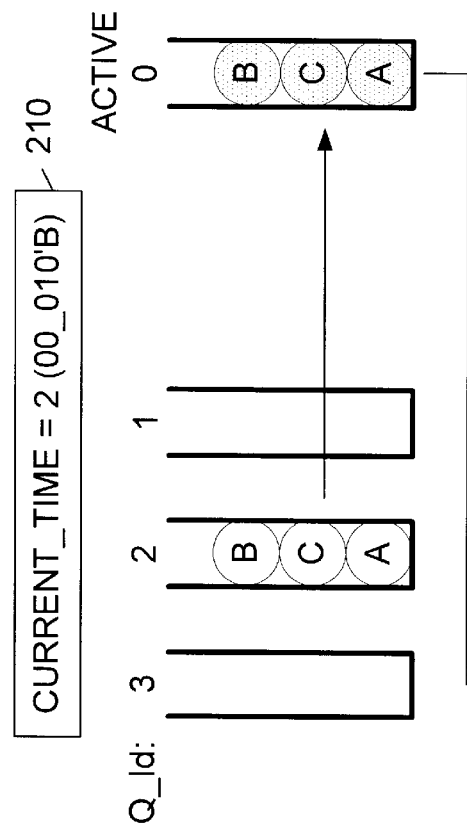
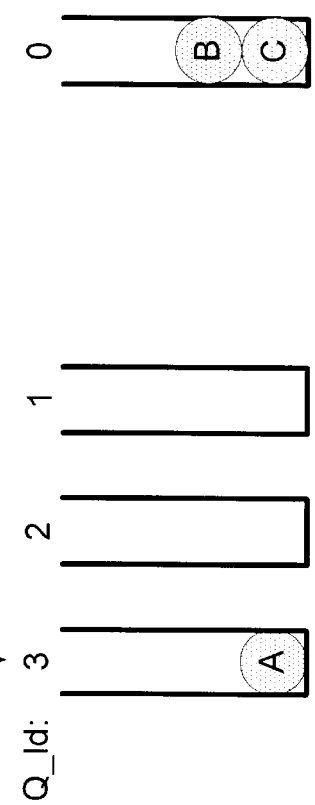
FIG. 5A
FIG. 5B
FIG. 5C
FIG. 5

FIG. 6A

CURRENT_TIME = 3 (00_110'B) — 210

Q_Id: 3 2 1 ACTIVE 0
A         B C

HISTORY: B A C

CURRENT_TIME = 4 (00_100'B) — 210

Q_Id: 3 2 1 0 ACTIVE
       C A       B A C

HISTORY: B A C B

FIG. 7

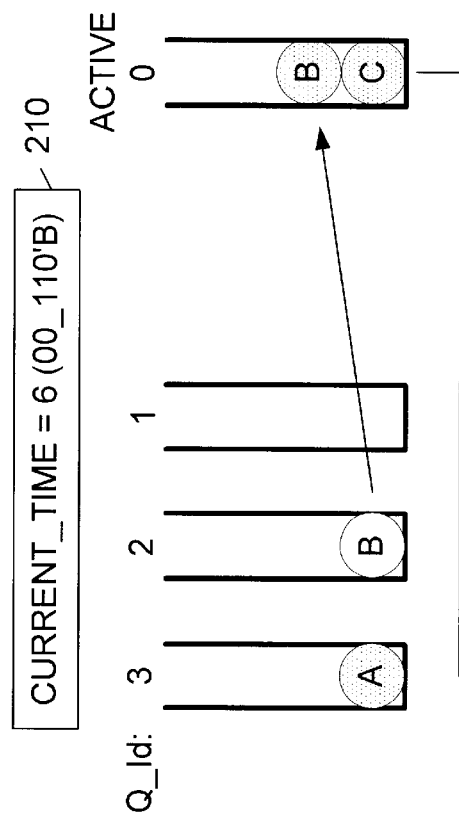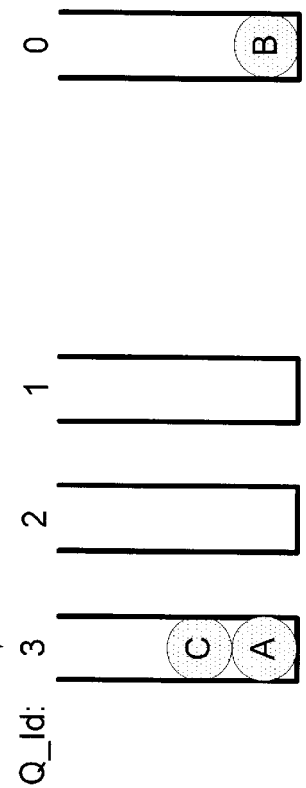
FIG. 9

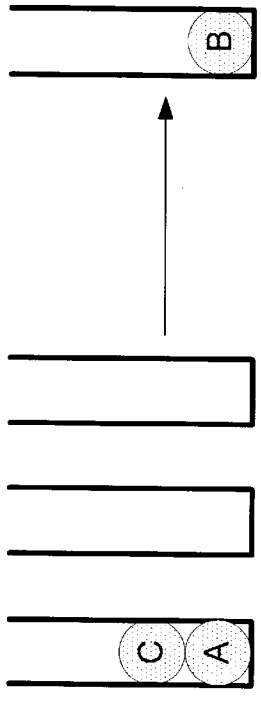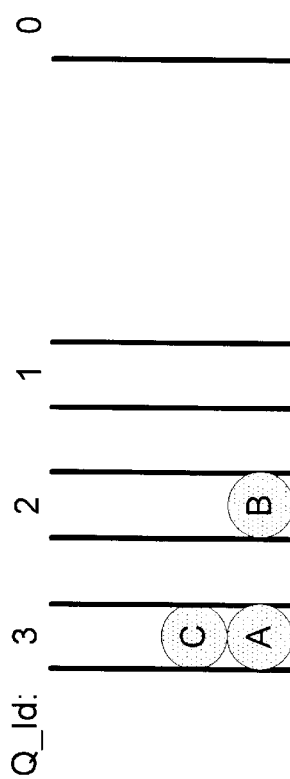
FIG. 10A
FIG. 10B
FIG. 10C
FIG. 10

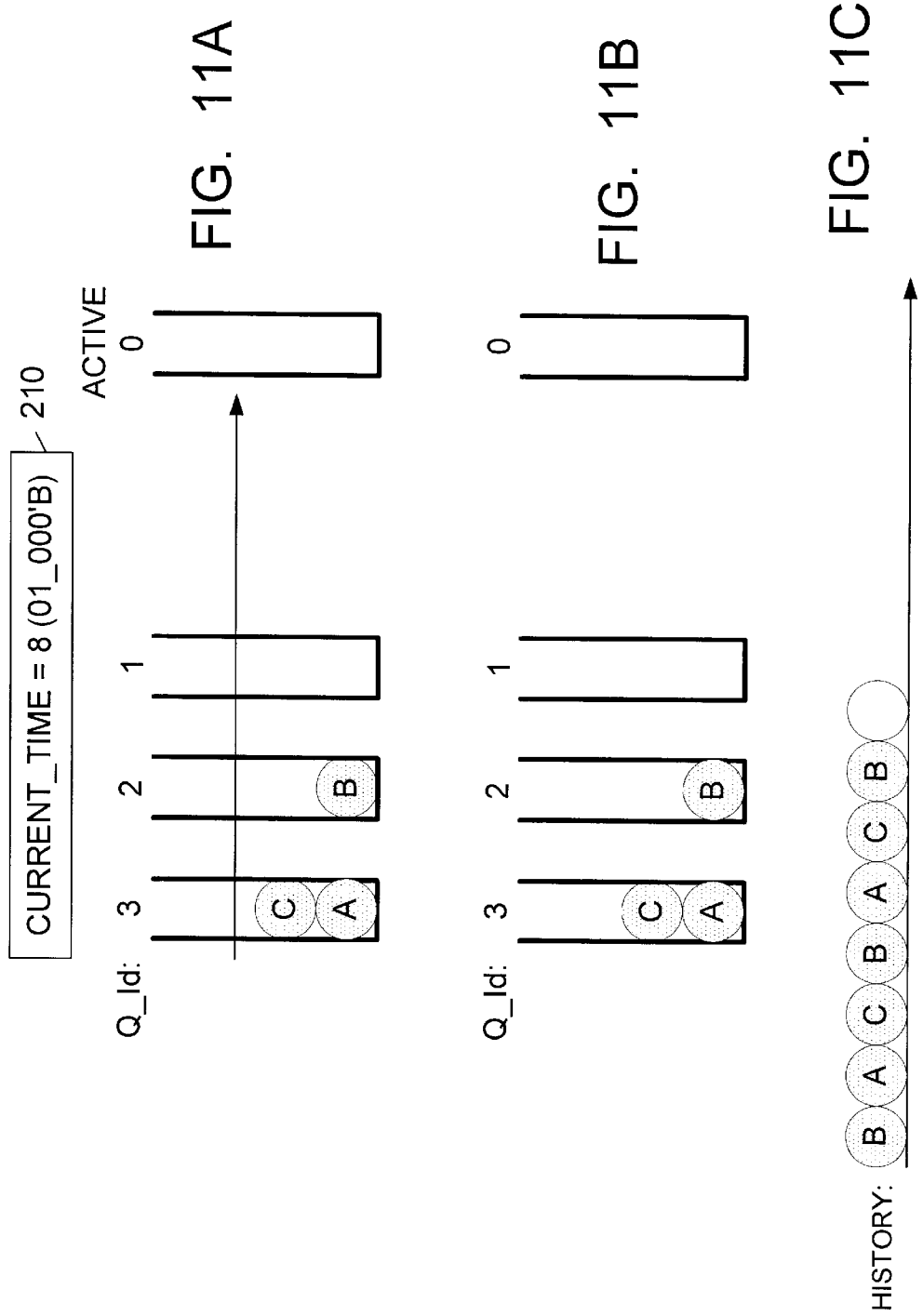

FIG. 12A

CURRENT_TIME = 21 (10_101'B) — 210

ACTIVE

Q_Id:   0   1   2   3
        C       A B (arrow from Q_Id 2 group to 0: C moves to active; arrow down to Q_Id 3)

HISTORY: B A C B A C B A B C A C B B C

FIG. 12

SELECTION OF DATA FOR NETWORK TRANSMISSION

BACKGROUND OF THE INVENTION

The present invention relates to networks, and more particularly to selecting data for transmission in networks.

Data transmission in networks may be subjected to some bandwidth (i.e., bits-per-second) requirements. For example, on a voice channel, data may have to be transmitted at exactly 64 Kbps. In another example, a network user may have contracted with a network service provider for a minimum and maximum bandwidth parameters. The network provider must limit the user's data rates to these bandwidth parameters.

FIG. 1 illustrates a scheduler that selects (schedules) data for transmission in accordance with predefined bandwidth parameters. The scheduler is used in an asynchronous transfer mode (ATM) switch. The scheduler schedules data transmission on virtual connections (VCs) 120 which share an output port 130. Each VC is to be given some bandwidth which is a portion of the total bandwidth of port 130. The bandwidth of each VC is defined by a parameter $\Delta$ (a separate parameter for each VC). $\Delta$ is the number of cell times in which a single ATM cell must be transmitted on the VC. $\Delta$ can be thought of as the time between transmission of consecutive cells on the VC.

The scheduling method can be conceptually represented using a time wheel 140. The time wheel has a number of time slots 150.0, 150.1, 150.2, 150.3. . . Each of these time slots 150 is associated with a queue 160 of virtual connections 120 which should transmit a cell at the same time in order to meet their respective bandwidth parameters $\Delta$. However, only one VC can transmit on port 130 at any given time.

Each cell time, the time wheel rotates clockwise by one time slot. Hence, the queue 160 of slot 150.2 moves to slot 150.1, the queue 160 of slot 150.3 moves to slot 150.2, and so on. When a queue 160 reaches slot 150.0, its VCs are added to active queue 160.0. The active queue contains VCs that should transmit in the current cell time. One VC is dequeued from the head of the active queue. This VC is shown at 120.0 in FIG. 1. A cell is transmitted from this VC to port 130. Then the VC 120.0 is moved to the queue 160 in time wheel slot $\Delta$ (i.e., slot 150.$\Delta$) where $\Delta$ is the bandwidth parameter of the VC 120.0. This means the VC will return to the active queue in $\Delta$ cell times, which is when the next cell on the VC should be transmitted.

When a VC 120 is added to active queue 160.0, the VC may have to wait for other VCs ahead in the queue before a cell from the VC is transmitted. If VC 120.0 has waited for "d" cell times, the VC is moved to queue $\Delta$–d (i.e., queue of slot $\Delta$–d) rather than $\Delta$. Therefore, the VC will re-enter the active queue 160.0 "d" cell times earlier.

In one implementation, a Current_Time counter keeps the current time, measured in cell times. Each VC 120 is associated with a time stamp register TS storing the time when the next cell should be transmitted on the VC. When a cell is transmitted on the VC, the corresponding TS is incremented by $\Delta$. Then the VC is moved to queue Q_Id= TS–Current_Time. Since TS and $\Delta$ can be fractional numbers, Q_Id is actually computed as int (TS)–Current_Time, where "int" is a function equal to the largest integer not exceeding the argument TS. See European patent application EP 0 874 531 "ATM Cell Scheduling Method" filed by MMC Networks, Inc. (published Oct. 28, 1998). See also "AF5500 Chip Set User Guide" (MMC Networks, Inc. of Sunnyvale, Calif. July 1998), pages 8-1 through 8-40.

Improvements on this scheme are desirable.

SUMMARY

The inventor has observed that if the total bandwidth of port 130 is high but the minimal supportable bandwidth for an individual VC is allowed to be low, the cell scheduling method of FIG. 1 can require a large number of queues 160. The number of queues required is determined by the maximum value of the $\Delta$ parameters. This is because when a cell is transmitted on a VC, the VC can be returned to the queue number $\Delta$ to allow the next cell transmission in $\Delta$ time slots. It can be shown that the maximum value of $\Delta$ is the ratio TB/mb, where TB is the total bandwidth of port 130 and mb is the minimum bandwidth supported by the ATM switch (here the bandwidth is measured in bits per second). For example, if port 130 is an optical carrier OC-192 port (9953.280 Mbps) and "mb" represents a DSO voice channel (64 Kbps), the number of queues required is 9953280/64= 155520. This large number of queues requires a large memory. The large memory increases the size, cost and power dissipation of the switch.

In one scheduler of the present invention, the number of queues required is reduced exponentially to about log (max $\Delta$) where "log" is a logarithm base 2 and "max $\Delta$" is the maximum value of $\Delta$. The scheduler works as follows. Let the non-active queues be denoted as Q1, Q2, . . . QN, where N is the number of queues. N is $\lceil \log (\max \Delta) \rceil$, i.e., log (max $\Delta$) rounded up to an integer. VCs are transferred from queue Q1 to the active queue every second cell time, from queue Q2 to the active queue every fourth cell time, from queue Q3 to the active queue every eighth cell time, and so on. VCs are transferred from queue Qi to the active queue every $2^i$th cell time.

As in FIG. 1, one VC is selected from the active queue for transmission every cell time. A cell is transmitted on the VC and the VC is moved to the queue Qi, where the queue number i=log $\Delta$, rounded to an integer. If the VC has waited in the active queue for "d" cell times, then i=log ($\Delta$–d), rounded to an integer.

The invention is not limited to the embodiments described above. Queues Qi and the active queue can be replaced with non-queue data structures. The invention can be applied to non-ATM networks. The invention can be applied to data flows other than VCs. Other embodiments and variations are within the scope of the invention, as defined by the appended claims.

BRIEF DESCRIPTION OF THE DRAWINGS

FIGS. 3–12 illustrate the state of queues in subsequent time slots in one example according to the present invention.

DETAILED DESCRIPTION OF SOME EMBODIMENTS

Figure 1:
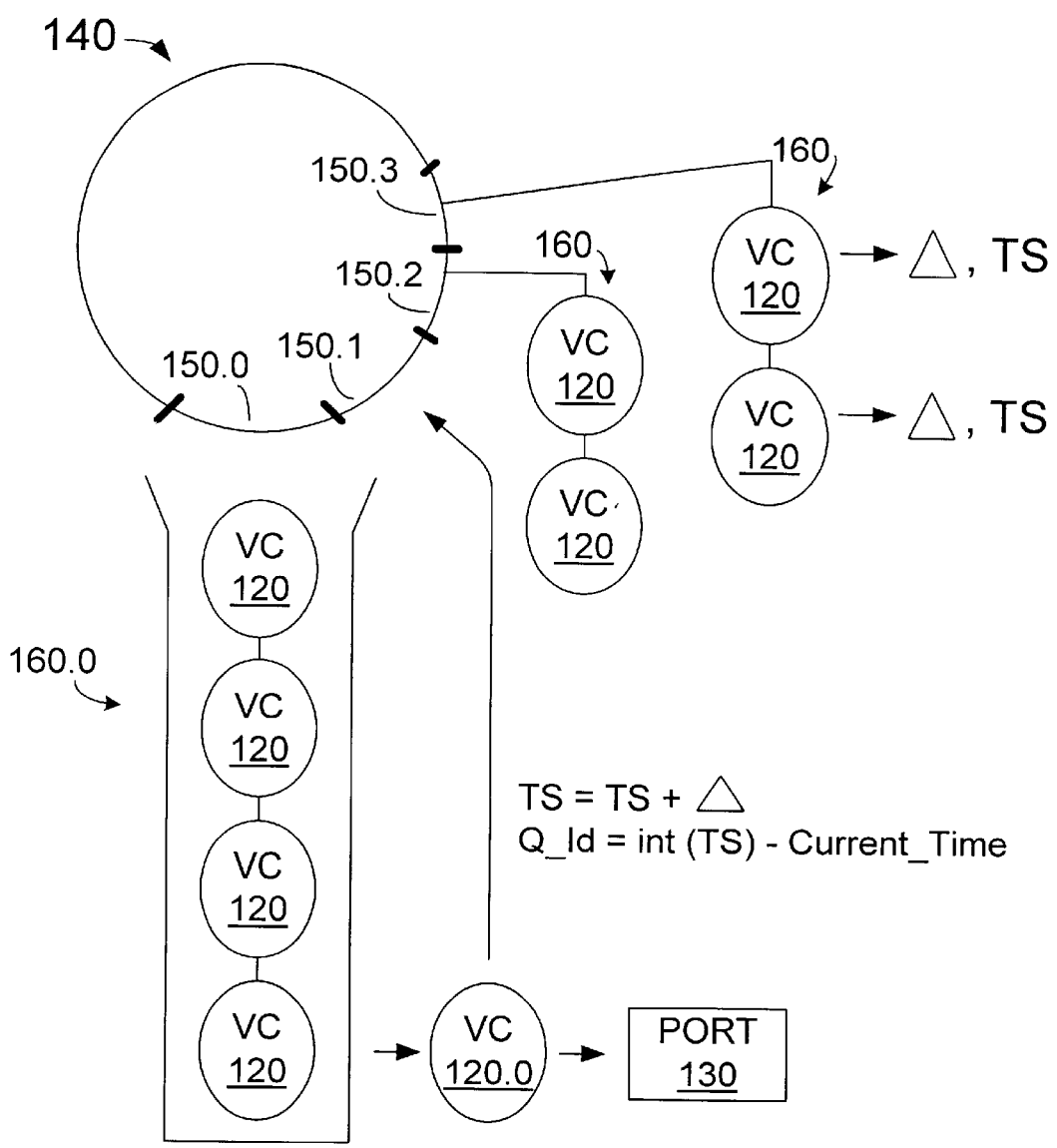
FIG. 1 illustrates a prior art ATM cell scheduling method.
Figure 2:
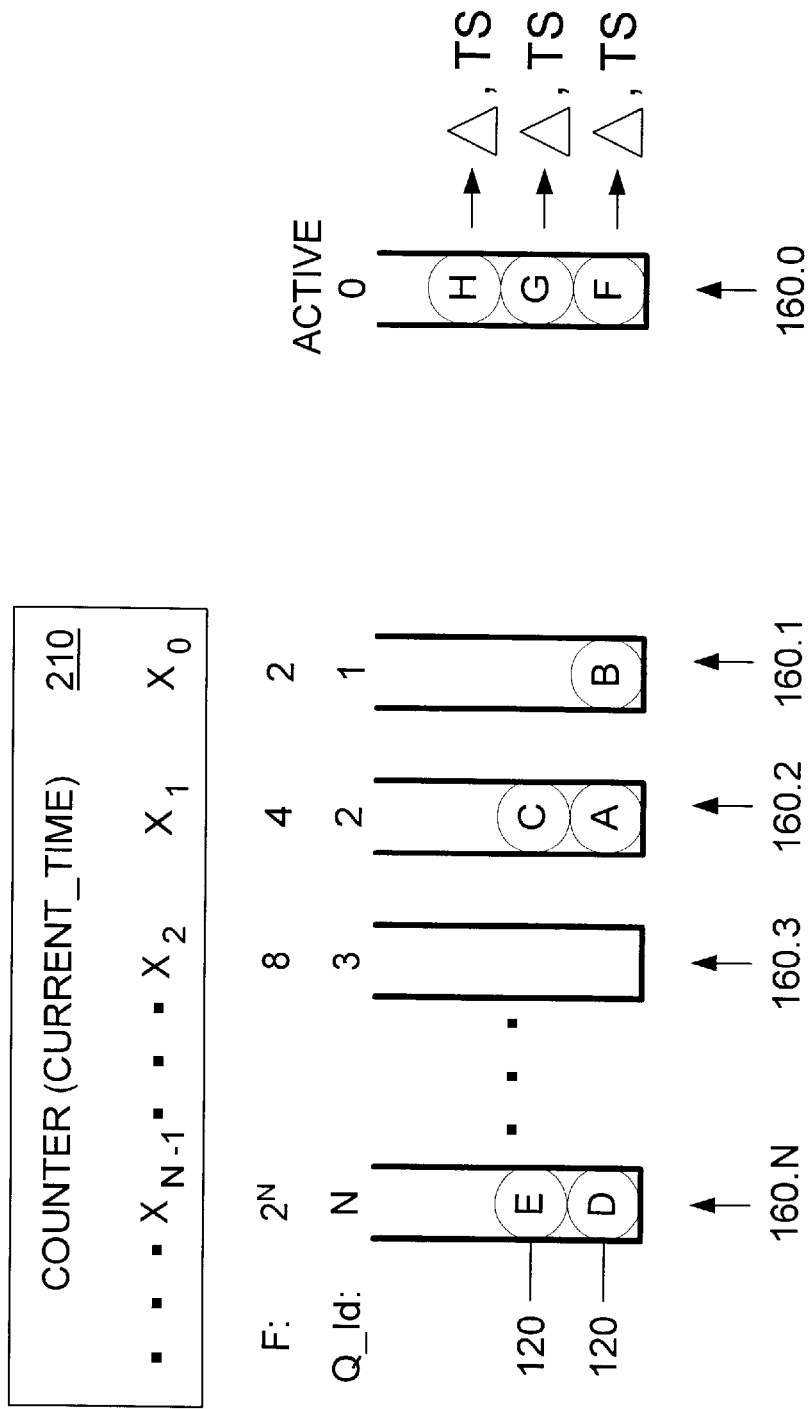
FIG. 2 illustrates a scheduling method according to the present invention.
Figure 3:
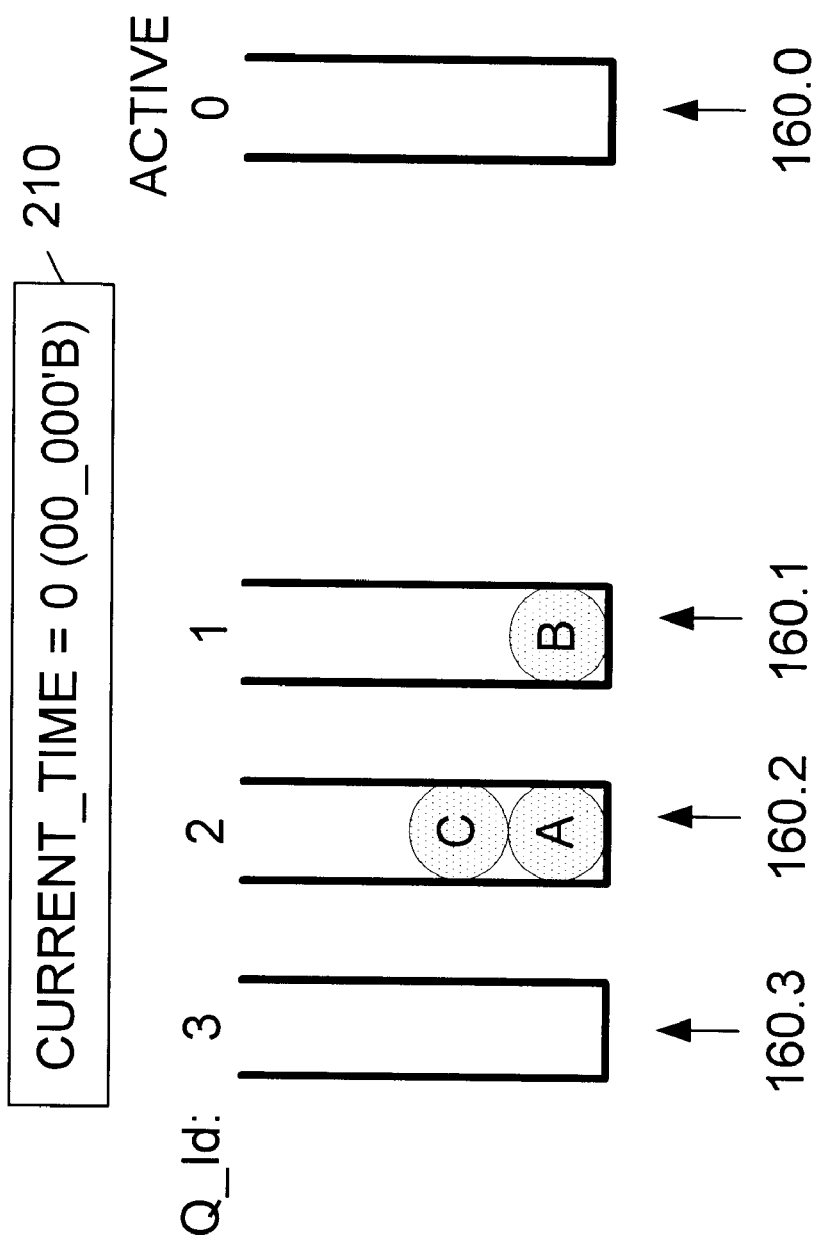
Figure 8:
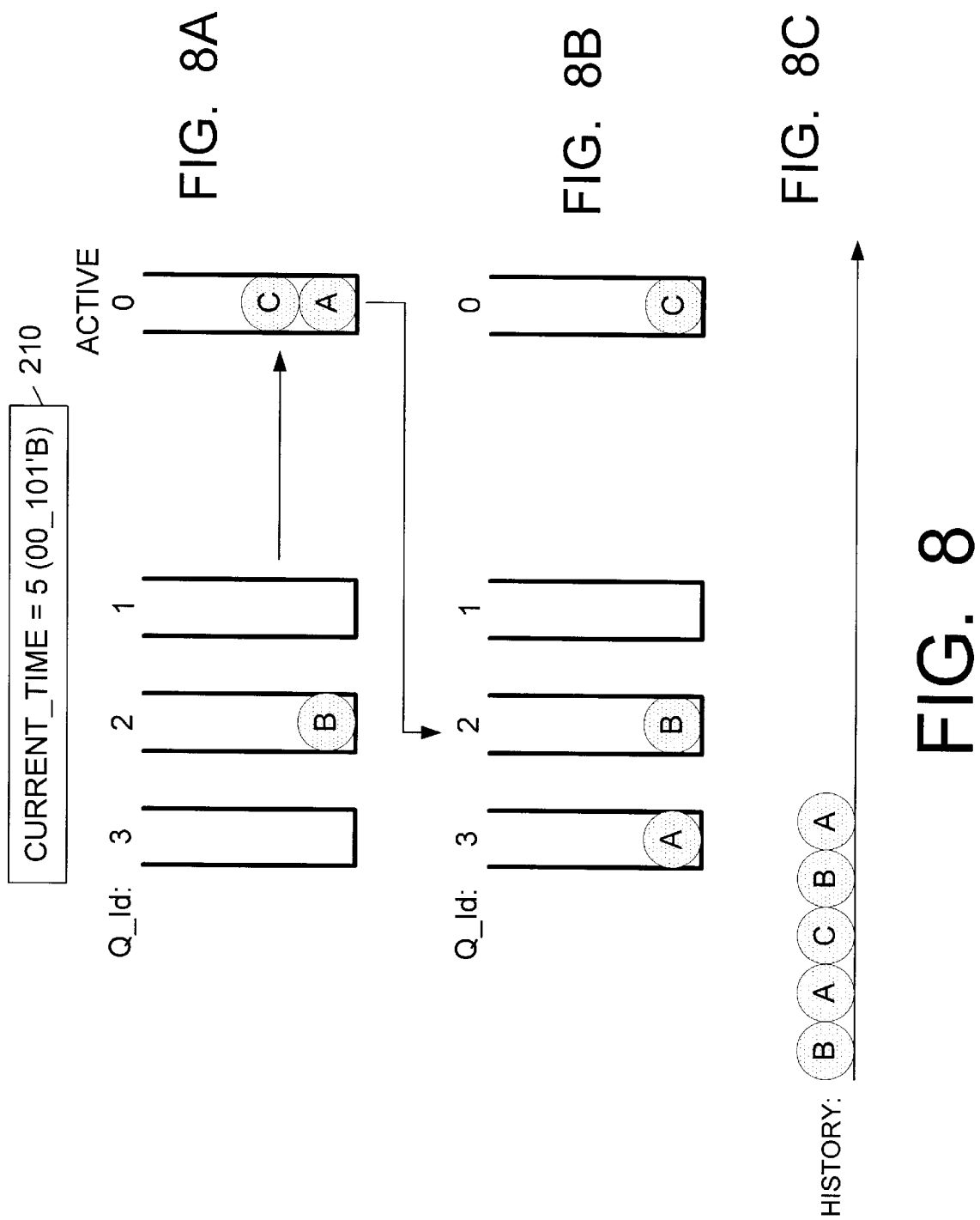

FIG. 2 illustrates an ATM cell scheduling method according to one embodiment of the present invention. VCs 120 are shown as circles marked A through H. As in FIG. 1, VCs 120 share an output port 130 (not shown in FIG. 2). Each VC is represented by a data structure in the memory of the switch.

The VCs (i.e., their data structures) are placed into N queues 160.0, 160.1, 160.2, 160.3, . . . 160.N, where N=⌈log (max Δ)⌉. Queue 160.0 is the active queue.

For each queue 160.i, we refer to i as the queue number or the queue ID, shown as "Q_Id" in FIG. 2. The queue IDs are shown above each queue. The number F ("frequency") represents the frequency with which the VCs of each queue 160.i are transferred to the active queue 160.0. For queue 1 (i.e., queue 160.1), F=2, that is, the corresponding VCs are transferred to active queue 160.0 every second cell time. For queue 160.2, F=4. For queue 160.i (i>0), F=$2^i$.

As in FIG. 1, each VC 120 is associated with a bandwidth parameter Δ and a time stamp register TS. TS stores the time in which the next cell should be transmitted to meet the Δ parameter. Current_Time register 210 keeps the current time, as in FIG. 1.

As in FIG. 1, in each cell time a VC 120 is dequeued from the head of the active queue 160.0. A cell is transmitted on the VC, and the VC's time stamp TS is incremented by Δ. Then a value "Offset" is computed according to the formula:

Offset=int (*TS*)−Current_Time.

Then if the VC has more cells to transmit, the VC is moved to a queue "Q_Id" determined as follows:

If Offset≦0, then Q_Id=0, that is, the VC is added back to the active queue 160.0.

If Offset>0, then Q_Id is the number of the most significant bit (MSB) of the Offset. In other words, Q_Id=int (log (Offset)).

Table 1 below summarizes steps performed in each cell time in some embodiments of FIG. 2. In Table 1, in each cell time, at most one of queues 160.1, . . . 160.N is transferred to active queue 160.0. The queue number Q_Id_To_Active of the queue whose VCs are transferred to queue 160.0 is determined using a counter incremented by 1 every cell time. In FIG. 2, the counter is Current_Time counter 210. Only the N least significant bits (LSBs) $x_0, x_1, x_2, \ldots x_{N-1}$ of the counter are used to determine the queue number. In the embodiment of FIG. 1, the counter has only N bits. When the counter is incremented, at most one of these bits changes from 0 to 1 in every cell time. Bit $x_0$ changes from 0 to 1 every second cell time; bit $x_1$ changes from 0 to 1 every fourth cell time; and so on. Bit $x_i$ changes from 0 to 1 every $2^i$th cell time. The queue number Q_Id_To_Active is determined as b+1 where $x_b$ is the bit that changes from 0 to 1 in the current cell time.

TABLE 1

1. Select queue 160.i for transfer to active queue 160.0:
  1A. Q_Id_To_Active = b + 1, where b is the number of the bit changed
from 0 to 1 when Current_Time was incremented. If Current_Time
changed from all ones to zero, then Q_Id_To_Active is not valid and
no queue is selected.
  1B. If Q_Id_To_Active is valid, then transfer VCs from queue
Q_Id_To_Active to end of active queue 160.0. Otherwise,
do not transfer any VCs to the active queue.
2. Transmit on a VC:
  2A. Dequeue a VC from the head of active queue 160.0. We denote this
VC, "VC0".
  2B. Transmit a cell from VC VC0 to port 130.
  2C. For VC VC0, set TS = TS + Δ
  2D. Compute:
Offset = int (TS (VC0)) − Current_Time
Q_Id = bit number of the MSB of Offset.

TABLE 1-continued

Move VC VC0 to the end (tail) of queue Q_Id. (If Q_Id = 0, then
this is the active queue.)

The scheduler of Table 1 can be implemented using known techniques.

FIGS. 3–12 illustrate the states of queues 160 in one example in which N=3. Three VCs 120 are defined, marked respectively A, B, C. Each VC is to be given a percentage of the bandwidth as shown in the following Table 2:

TABLE 2

| VC | Percentage of Bandwidth to be given to the VC | Δ |
|---|---|---|
| A | 20% | 5 |
| B | 33% | 3 |
| C | 15% | 6.67 |

The initial time stamp values are equal to the corresponding Δ values, that is:

TS(A)=5

TS(B)=3

TS(C)=6.67

Current Time 210 is a five-bit counter. When Current Time changes from 7 to 8, the three LSBs become zero, Q_Id_To_Active is not valid, and no queue is transferred to the active queue.

Initially (when Current Time is zero), each VC is placed in the queue whose Q_Id is the number of the most significant bit of the corresponding time stamp TS. Thus, VCs A and C are placed in queue 2 and VC B in queue 1. See FIG. 3.

Table 3 below shows Current Time and some other parameters for each of FIGS. 3–12.

Each of FIGS. 4–12 includes 3 figures. For example, FIG. 4 includes FIGS. 4A, 4B, 4C. FIG. 4A shows the queues before a VC has been selected for transmission. In queue 1, VC B is unshaded. This means VC B is moved to the active queue in that cell time. The remaining VCs are shaded.

FIG. 4B shows the queues after a VC has been selected from the active queue and has been returned to some other queue. (We assume that after the cell has been transmitted from the VC, the VC has other cells to transmit. If not, the VC can still return to another queue or, alternatively, can be removed from the scheduler until it gets a cell to transmit.) FIG. 4C shows the history, i.e., the sequence in which the VCs are selected for transmission.

FIGS. 5–12 are organized in a similar manner.

In FIG. 4, Current Time has become 1. According to Table 1, step 1, the value b=0, so queue 1 has its VCs transferred to the active queue. This means VC B is transferred to the active queue. Since VC B is the only VC in the active queue, VC B is selected for transmission at step 2 of Table 1. See Table 3, column 3 for FIG. 4.

At steps 2C, 2D (Table 1), the following operations are performed for VC B (see Table 3, last column):

TS(B)=3+3=6

Offset=int(6)−1=5(0101'b, i.e., 0101 binary).

The MSB of the Offset value indicates that Q_Id=2. Therefore, VC B is moved to queue 2, as shown in FIG. 4B.

Examination of the history diagram in FIG. 12C indicates that the average bandwidth actually given to each VC corresponds to the VC's Δ parameter.

TABLE 3

| Current_Time (CT) and Q_Id of queue transferred to active queue (Q_Id_To_Active in Table 1, step 1) | VC selected for transmission | TS, Offset, and new Q_Id for VC selected for transmission (Table 1, step 2) |
|---|---|---|
| 3  0 (00_000'b) Q_Id = none (not valid; no queue is transferred) | none | |
| 4  CT = 1 (00_001'b) Q_Id = 1 | B | TS(B) = TS(B) + Δ(B) = 3 + 3 = 6 Offset = int(TS) − Current_Time = 6 − 1 = 5 (0101'b) Q_Id(B) = 2 |
| 5  CT = 2 (00_010'b) Q_Id = 2 | A | TS(A) = 5 + 5 = 10 Offset = int(10) − 2 = 8 (1000'b) Q_Id(A) = 3 |
| 6  CT = 3 (00_011'b) Q_Id = 1 | C | TS(C) = 6.67 + 6.67 = 13.34 Offset = int(13.34) − 3 = 10 (1010'b) Q_Id(C) = 3 |
| 7  CT = 4 (00_100'b) Q_Id = 3 | B | TS(B) = 6 + 3 = 9 Offset = int(9) − 4 = 5 (0101'b) Q_Id(B) = 2 |
| 8  CT = 5 (00_101'b) Q_Id = 1 | A | TS(A) = 10 + 5 = 15 Offset = int(15) − 5 = 10 (1010'b) Q_Id(A) = 3 |
| 9  CT = 6 (00_110'b) Q_Id = 2 | C | TS(C) = 13.34 + 6.67 = 20.01 Offset = int(20.01) − 6 = 14 (1110'b) Q_Id(C) = 3 |
| 10  CT = 7 (00_111'b) Q_Id = 1 | B | TS(B) = 9 + 3 = 12 Offset = int(12) − 7 = 5 (0101'b) Q_Id(B) = 2 |
| 11  CT = 8 (01_000'b) Q_Id = none | none | |
| ... | ... | ... |
| 12  CT = 21 (10_101'b) Q_Id = 1 | C | TS(C) = 26.68 + 6.67 = 33.35 Offset = int(33.35) − 21 = 12 (1100'b) Q_Id(C) = 3 |

Figure 13:
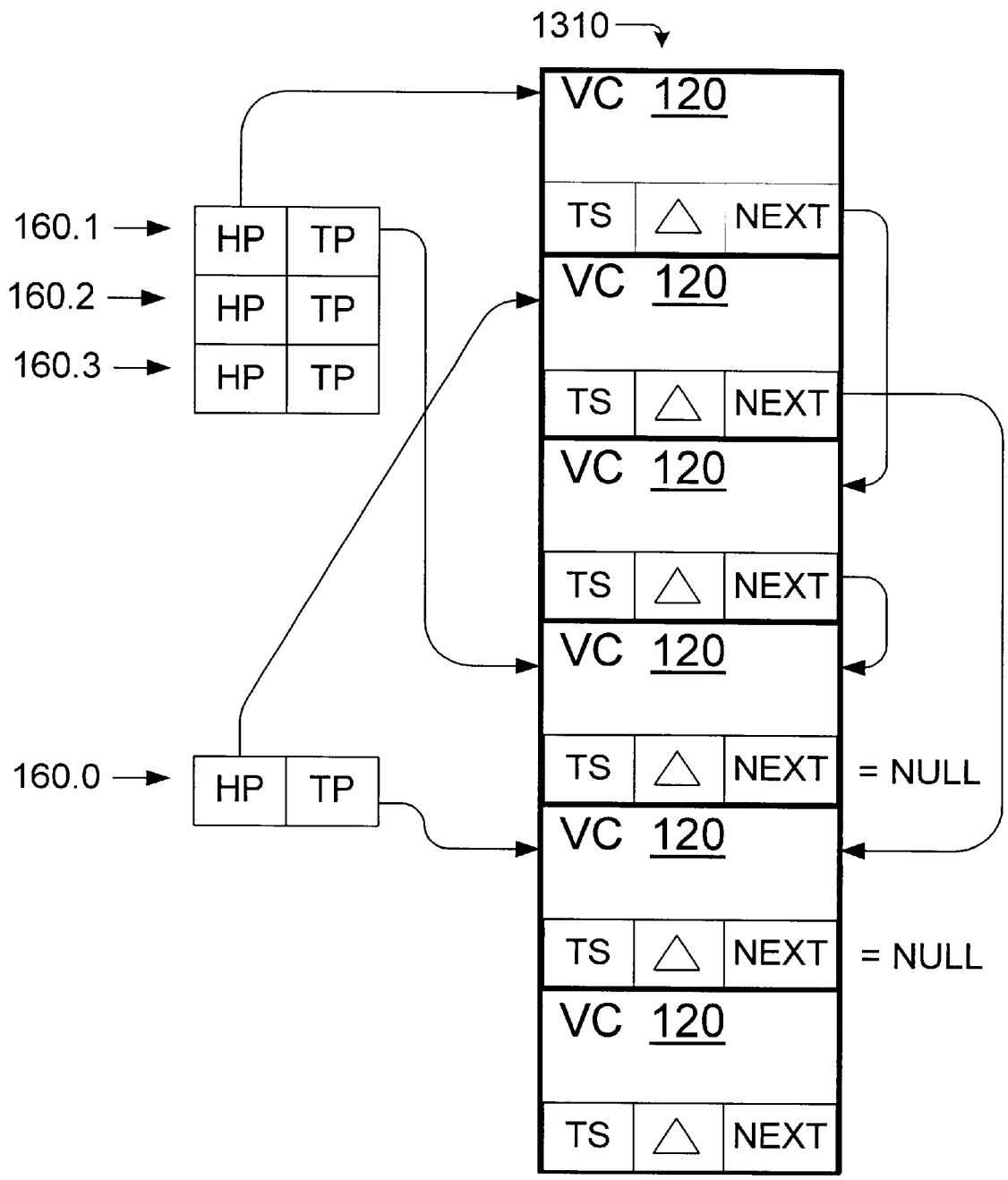
FIG. 13 illustrates data structures in a switch according to the present invention.

FIG. 13 illustrates data structures in one scheduler of the present invention. VC data structures 120 are stored in a table 1310. For each VC 120, the corresponding table entry stores the corresponding time stamp TS, the bandwidth parameter Δ, and a "Next" pointer to the next VC in a queue 160. The Next pointer of the last VC of each queue 160 is NULL.

Each queue 160 includes a head pointer register HP pointing to the first VC in the queue, and a tail pointer register TP pointing to the last VC in the queue. These data structures are manipulated using methods known in the art. See for example, U.S. Pat. 5,901,147 issued May 4, 1999 to A. Joffe and incorporated herein by reference.

The invention is not limited to the embodiments described above. In some embodiments, the number of the queue that is transferred to the active queue is determined using a separate counter rather than Current Time. In some embodiments, the separate counter is decremented rather than incremented. The queue number Q_Id=b+1 where b is the number of the bit that changed from 1 to 0. Other methods for determining which queue is to be transferred to the active queue can also be used.

The queues 160 can be replaced with other data storage structures, e.g., with non-queue data structures.

Different steps need not to be performed in the order shown. For example, in Table 1, steps 1 and 2 can overlap.

In some embodiments, Q_Id at step 2D of Table 1 is determined as ⌈log (Offset)⌉−Current_Time. In other embodiments, log (Offset) is rounded using some other rounding method, e.g., rounding to the nearest integer. The invention is not limited to any particular formula for the Q_Id computation.

In some embodiments, each VC structure 120 represents a virtual path that may include multiple virtual connections. In some embodiments, a structure 120 represents a group of virtual paths or connections which is allocated some combined bandwidth. When this group of virtual paths or connections is scheduled to transmit a cell, another scheduler (not shown) selects a VC or VP (virtual path) from the group for transmission. The other scheduler can use any suitable method to select a virtual connection or virtual path. Suitable methods include strict priority (the highest priority VC or VP is selected), round robin, weighted round robin, and weighted fair queuing. See "AF5500 Chip Set User Guide" (MMC Networks, Inc., Sunnyvale, Calif. July 1998), pages 8–15 through 8–24, incorporated herein by reference. Other suitable methods are described in European Patent Application EP 0 874 532 entitled "Asynchronous Transfer Mode Cell Scheduling Method" (MMC Networks, Inc.) incorporated herein by reference.

The scheduler of FIG. 2 can be combined with other such schedulers, or different schedulers, to guarantee a minimum bandwidth to a VC and at the same time to limit the maximum bandwidth, as described in EP 0 874 532 and EP 0 874 531, both incorporated herein by reference.

Further, the invention is not limited to ATM. In some embodiments, each structure 120 represents a non-ATM data flow or flows. We use the term "data flow" to denote any data transmission that can be assigned a bandwidth and can compete for bandwidth with other transmissions. For example, a VP is a data flow. Each VC within a VP is also a data flow. Another example of a data flow is a flow of IP packets having a predetermined source address and a predefined destination address. Another example is a flow of data on a TCP connection or a group of TCP connections. Other examples are possible.

In some embodiments, port 130 (FIG. 1) on which the data are transmitted is a logical port, not a physical port. For example, port 130 may be a sub-port representing a portion of the bandwidth available at some physical port or a combination of physical ports. Other embodiments and variations are within the scope of the invention, as defined by the appended claims.

What is claimed is:

1. A circuitry implemented method for selecting data for transmission in a network, the method comprising:

storing representations of data flows in storage structures $S_1, \ldots S_N$, wherein $N>1$, wherein each data flow is associated with a bandwidth to be given to the data flow;

transferring zero or more data flow representations from storage structures $S_1, \ldots S_N$ to a storage structure $S_0$, wherein for each i ($0<i<N$), the frequency with which the zero or more data flow representations are transferred from structure $S_i$ to structure $S_0$ is greater than the frequency with which zero or more data flow representations are transferred from structure $S_{(i+1)}$ to structure $S_0$;

selecting a data flow representation from structure $S_0$ to transmit data on the corresponding data flow;

transferring the selected data flow representation to a structure $S_j$ ($0 \leq j \leq N$) for subsequent transmission on the corresponding data flow, wherein the structure $S_j$ is chosen from structures $S_0, \ldots, S_N$ based on the bandwidth to be given to the corresponding data flow.

2. The method of claim 1 wherein for each i ($0<i<N$), the frequency with which the zero or more data flow representations are transferred from structure $S_i$ to structure $S_0$ is twice greater than the frequency with which the zero or more data flow representations are transferred from structure $S_{(i+1)}$ to structure $S_0$.

3. The method of claim 2 wherein:
for each i ($0<i<N$), the zero or more data flow representations are transferred from structure $S_i$ to structure $S_0$ once in every $2^i$ time units; and
when a data flow representation is selected for transmission, a data unit is transmitted from the corresponding data flow, and if the corresponding data flow has more data to transmit, the data flow representation is transferred to structure $S_j$ where j=log Δ, rounded to an integer, where Δ is the number of the time units in which one data unit is to be transmitted on the data flow in accordance with the bandwidth to be given to the data flow.

4. The method of claim 2 further comprising incrementing or decrementing a counter once in every time unit, wherein the time unit is a length of time that it takes to transmit data from a data flow when the corresponding data flow representation is selected for transmission;
wherein when the counter is incremented or decremented, a number b is determined which is the number of the counter's bit that changes from a predetermined first value to a predetermined second value, the bits being numbered from zero up starting with the least significant bit, and zero or more data flow representations are transferred to structure $S_0$ from structure $S_i$ where i=b+1.

5. The method of claim 1 wherein for at least one data flow, the associated bandwidth is the minimal bandwidth to be given to the data flow; and
the method further comprises transmitting data on the corresponding data flow, when bandwidth is available, even when the corresponding data flow representation is not selected from structure $S_0$, thereby giving additional bandwidth to the data flow in addition to the minimal bandwidth.

6. The method of claim 1 wherein at least one data flow comprises a plurality of data flows.

7. The method of claim 1 wherein the storage structures $S_1, \ldots S_N$ and the storage structure $S_0$ comprise data queues.

8. The method of claim 1 wherein the data flows are a type selected from a group consisting of ATM cells, IP packets, or TCP connections.

9. The method of claim 8 wherein the first data storage structures are identified as a $S_i$ data storage structure where $0<i<N+1$, wherein for each i ($0<i<N$), the frequency with which data flow representations are transferred from structure $S_i$ to second data storage structure is greater than the frequency with which data flow representations are transferred from structure $S_{(i+1)}$ to second data storage structure.

10. The method of claim 9 wherein the frequency with which data flow representations are transferred from a first data storage structure $S_i$ to the at least one second data storage structure is at least twice the frequency with which data flow representations are transferred from a first data storage structure $S_{(i+1)}$ to second data storage structure.

11. The method of claim 10 wherein data flow representations are transferred from the structure $S_i$ to the at least one second data storage structure once every $2^i$ time units and when a data flow representation is selected for transmission, a data unit is transmitted from the corresponding data flow, and if the corresponding data flow has more data to transmit, the data flow representation is transferred to one of the first and second date structures in accordance with the bandwidth to be given to the data flow.

12. The method of claim 10 further comprising incrementing or decrementing a counter once every time unit, wherein the time unit is a length of time that it takes to transmit data from a data flow when the corresponding data flow representation is selected for transmission;
wherein when the counter is incremented or decremented, a number b is determined which is the number of the counter's bit that changes from a predetermined first value to a predetermined second value, the bits being numbered from zero up starting with the least significant bit, and data flow representations are transferred to the second data storage structure from a first data storage structure $S_i$ of the plurality of first data storage structures where i=b+1.

13. An apparatus for transmitting data over a network, the apparatus comprising:
a computer storage for storing computer representations of data flows, wherein each data flow is associated with one or more bandwidth requirements for the data flow;
circuitry for storing the data flow representations in a plurality of first structures in the computer storage, for transferring data flow representations from the first structures to a second structure such that at least two of the first structures have their data flow representations transferred to the second structure with respective two different frequencies, the circuitry being operable to select a data flow representation from the second structure to be transmitted on the corresponding data flow based on a bandwidth requirement for the data flow and to transfer the selected data flow representation.

14. The apparatus of claim 13 wherein the circuitry is operable to leave the selected data flow representation in the second structure instead of transferring the selected data flow representation for transmission.

15. The apparatus of claim 13 wherein the circuitry comprises a counter incremented or decremented once in every time unit, wherein the counter comprises a plurality of bits each of which is associated with a corresponding one of the first structures, and wherein when one of said plurality of bits changes from a predetermined first value to a predetermined second value, the corresponding first structure has its data flow representations transferred to the second structure.

16. The apparatus of claim 13 wherein:
the circuitry is operable to store in the computer storage, for each data flow representation, a bandwidth parameter indicating how often a data unit needs to be transmitted on the corresponding data flow in order to satisfy a bandwidth requirement for the data flow;
when a data flow representation is selected from the second structure to transmit data on the corresponding data flow, the circuitry calculates when the next transmission on the data flow is to occur to satisfy the corresponding bandwidth parameter, and the circuitry is operable to transfer the data flow representation to the first data structure whose data flow representations will be transferred to the second data structure when the next transmission on the data flow needs to occur.

17. A circuitry implemented method for selecting data for transmission, the circuitry comprising a memory comprising a plurality of first data storage structures and at least one second data storage structure, the method comprising:
transferring data flow representations from the plurality of first data storage structures to the at least one second data storage structure such that at least two of the first data storage structures have data flow representations stored therein transferred to the at least one second data storage structure at two different rates; and selecting a data flow representation from the at least one second data storage structure, so that data associated with the data flow is transmitted based on the bandwidth to be given to the corresponding data flow.

18. The method of claim 17 wherein for at least one data flow, the associated bandwidth is the minimal bandwidth to be given to the at least one data flow; and the method further comprises transmitting data on the at least one data flow, when bandwidth is available, even when a corresponding data flow representation is not selected from the at least one second data storage structure for transmission.

19. The method of claim 17 wherein the plurality of first data storage structures and the at least one second data storage structure comprise data queues.

20. The method of claim 17 wherein the data flows are a type selected from a group consisting of ATM cells, IP packets, or TCP connections.

* * * * *